(12) United States Patent
Wyman

(10) Patent No.: US 7,468,757 B2
(45) Date of Patent: Dec. 23, 2008

(54) DETECTION AND CORRECTION OF IRREGULARITIES WHILE PERFORMING INVERSE TELECINE DEINTERLACING OF VIDEO

(75) Inventor: Richard Hayden Wyman, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 455 days.

(21) Appl. No.: 11/019,071

(22) Filed: Dec. 21, 2004

(65) Prior Publication Data

US 2006/0072037 A1 Apr. 6, 2006

Related U.S. Application Data

(60) Provisional application No. 60/616,071, filed on Oct. 5, 2004, provisional application No. 60/616,007, filed on Oct. 5, 2004.

(51) Int. Cl.
*H04N 5/253* (2006.01)
(52) U.S. Cl. ....................... 348/558; 348/448
(58) Field of Classification Search ................. 348/441, 348/448, 446, 447, 96, 97, 449, 451, 452, 348/455, 458, 459; 375/240.13, 240.01, 375/240.16
See application file for complete search history.

(56) References Cited

U.S. PATENT DOCUMENTS

| | | | |
|---|---|---|---|
| 4,400,719 A | 8/1983 | Powers | |
| 5,337,154 A | 8/1994 | Dorricott et al. | |
| 5,428,399 A * | 6/1995 | Robinson et al. | 348/459 |
| 5,457,499 A | 10/1995 | Lim | |
| 5,861,924 A | 1/1999 | Pan et al. | |
| 5,982,444 A | 11/1999 | Kato et al. | |
| 6,055,018 A | 4/2000 | Swan | |
| 6,262,773 B1 | 7/2001 | Westerman | |
| 6,269,484 B1 * | 7/2001 | Simsic et al. | 725/151 |
| 6,317,165 B1 * | 11/2001 | Balram et al. | 348/699 |
| 6,407,775 B1 * | 6/2002 | Frink et al. | 348/443 |
| 6,459,455 B1 * | 10/2002 | Jiang et al. | 348/452 |
| 6,563,550 B1 * | 5/2003 | Kahn et al. | 348/700 |
| 6,603,815 B2 | 8/2003 | Suzuki et al. | |
| 6,614,484 B1 * | 9/2003 | Lim et al. | 348/448 |
| 6,680,752 B1 * | 1/2004 | Callway et al. | 348/448 |
| 6,970,206 B1 * | 11/2005 | Swan et al. | 348/448 |
| 7,020,197 B2 | 3/2006 | Tanase et al. | |
| 7,042,512 B2 | 5/2006 | Yang et al. | |
| 7,075,581 B1 * | 7/2006 | Ozgen et al. | 348/448 |
| 7,129,990 B2 | 10/2006 | Wredenhagen et al. | |
| 7,170,561 B2 * | 1/2007 | Winger et al. | 348/448 |

(Continued)

*Primary Examiner*—David Ometz
(74) *Attorney, Agent, or Firm*—McAndrews, Held & Malloy, Ltd.

(57) ABSTRACT

Herein described are at least a system and a method of more effectively detecting and correcting irregularities when performing an inverse telecine deinterlacing of pull-down video. These irregularities may be caused by editing of the video, which when left undetected, may result in displaying video of unacceptable quality. In a representative embodiment, the method determines a first pixel luminance of an absent pixel using a luminance generated from one or more first present pixels, determines a second pixel luminance of the absent pixel using a luminance generated from one or more second present pixels, and determines a first luminance approximation for the absent pixel. In a representative embodiment, the system comprises a memory, a software resident in the memory, and a processor used to execute the software, such that executing the software performs the inverse telecine deinterlacing to result in an improve displayed video image quality.

39 Claims, 4 Drawing Sheets

U.S. PATENT DOCUMENTS

| | | |
|---|---|---|
| 7,177,470 B2 | 2/2007 | Jasinschi et al. |
| 7,202,907 B2 | 4/2007 | Chow |
| 2002/0171759 A1* | 11/2002 | Handjojo et al. ............ 348/452 |
| 2003/0156301 A1 | 8/2003 | Kempf et al. |
| 2004/0012673 A1 | 1/2004 | Tanase et al. |
| 2005/0018087 A1 | 1/2005 | Lee |
| 2005/0030422 A1 | 2/2005 | Leone et al. |
| 2005/0057646 A1* | 3/2005 | Cho et al. .................... 348/96 |

* cited by examiner

DETECTION AND CORRECTION OF IRREGULARITIES WHILE PERFORMING INVERSE TELECINE DEINTERLACING OF VIDEO

CROSS-REFERENCE TO RELATED APPLICATIONS/INCORPORATION BY REFERENCE

This application makes reference to and claims priority from U.S. Provisional Patent Application Ser. No. 60/616,071 entitled "Detection and Correction of Irregularities While Performing Inverse Telecine Deinterlacing of Video" filed on Oct. 5, 2004, the complete subject matter of which is incorporated herein by reference in its entirety.

This application makes reference to and claims priority from U.S. Provisional Patent Application Ser. No. 60/616,007 entitled "Detection and Phase Lock of 2:2 and 3:2 Pull-Down Video" filed on Oct. 5, 2004, the complete subject matter of which is incorporated herein by reference in its entirety.

This application makes reference to:
U.S. Provisional Application Ser. No. 60/616,007 filed Oct. 5, 2004;
U.S. patent application Ser. No. 11/018,987 filed Dec. 21, 2004;
U.S. patent application Ser. No. 10/945,619 filed Sep. 21, 2004;
U.S. patent application Ser. No. 10/945,587 filed Sep. 21, 2004;
U.S. patent application Ser. No. 10/871,758 filed Jun. 17, 2004;
U.S. patent application Ser. No. 10/945,796 filed Sep. 21, 2004; and
U.S. patent application Ser. No. 10/945,817 filed Sep. 21, 2004.

The above stated applications are hereby incorporated herein by reference in their entireties.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When performing inverse telecine of video, changes in the cadence of the video may result in irregularities of the image displayed. These irregularities may be caused by editing of the video prior to performing a reverse pull-down, for example. The irregularities caused by editing may be termed "bad-edits" while the irregularly displayed patterns may be termed "bad-weaves". Such bad-edits may include the incorporation of film credits that scroll or fade into the pull-down video. If left undetected and unaccounted for, the irregularities may result in one or more irregularly displayed patterns that are displeasing to a viewer.

The limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be found in a system and method of more effectively detecting and correcting irregularities when performing an inverse telecine deinterlacing of pull-down video.

In a representative embodiment, a method of detecting and correcting irregularities when performing an inverse telecine deinterlacing of pull-down video comprises determining a first pixel luminance of an absent pixel using a luminance generated from one or more first present pixels, wherein the one or more first present pixels have the same spatial coordinates of the absent pixel, and each of the one or more first present pixels is associated with a corresponding first pixels field, wherein the first pixels field is determined by temporally weaving in an expected weave direction. The method further comprises determining a second pixel luminance of the absent pixel using a luminance generated from one or more second present pixels, wherein the one or more second present pixels have the same spatial coordinates of the absent pixel, and each of the one or more second present pixels is associated with a corresponding second pixels field, wherein the second pixels field is determined by temporally weaving in an unexpected or opposite weave direction. The method further comprises determining a first luminance approximation for the absent pixel.

In yet another representative embodiment, a method of detecting whether an inverse telecine weave is expected to be processed in an incorrect temporal direction comprises determining a first pixel luminance of an absent pixel using a luminance generated from one or more first present pixels, determining a second pixel luminance of the absent pixel using a luminance generated from one or more second present pixels, determining a luminance approximation for the absent pixel, computing a first difference between the first pixel luminance and the luminance approximation, computing a second difference between the second pixel luminance and the luminance approximation, and computing a third difference by subtracting an absolute value of the second difference from an absolute value of the first difference.

In a representative embodiment, a system for detecting and correcting irregularities when performing an inverse telecine deinterlacing of pull-down video comprises a memory, a set of software instructions resident in the memory, and a processor used to execute the set of software instructions, wherein executing the set of software instructions performs the inverse telecine deinterlacing to improve displayed video image quality.

In yet another representative embodiment, a system for detecting and correcting irregularities when performing an inverse telecine deinterlacing of pull-down video comprises a first circuitry for determining a first pixel luminance of an absent pixel using a luminance generated from one or more first present pixels, wherein the one or more first present pixels having the same spatial coordinates of the absent pixel, and each of the one or more first present pixels is associated with a corresponding first pixels field. The corresponding first pixels field is determined by temporally weaving in an expected weave direction. The system further comprises a second circuitry for determining a second pixel luminance of the absent pixel using a luminance generated from one or more second present pixels, wherein the one or more second present pixels having the same spatial coordinates of the absent pixel, and each of the one or more second present pixels is associated with a corresponding second pixels field.

The corresponding second pixels field is determined by temporally weaving in an unexpected or opposite weave direction.

These and other advantages, aspects, and novel features of the present invention, as well as details of illustrated embodiments, thereof, will be more fully understood from the following description and drawings.

DETAILED DESCRIPTION OF THE INVENTION

Figure 1:
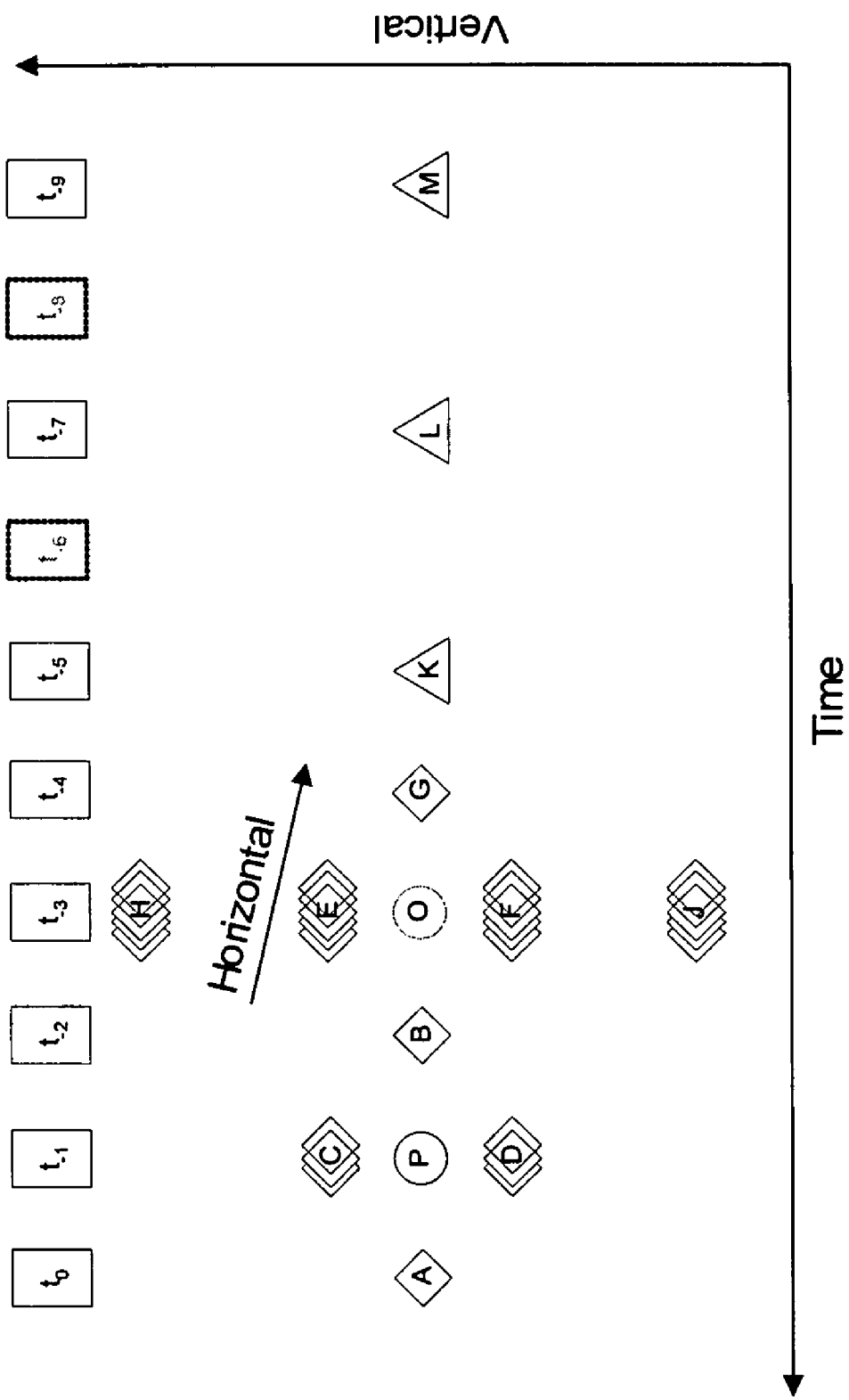
FIG. 1 illustrates a pixel constellation that is used by the bad-weave algorithm while performing inverse telecine, in accordance with an embodiment of the invention.

Aspects of the present invention may be found in a system and method of more effectively detecting and correcting irregularities when performing an inverse telecine deinterlacing of pull-down video. For example, the cadence of pull-down video may be irregular. These irregularities may be caused by editing of the video, which when left undetected, may result in one or more irregularly displayed patterns when performing a reverse pull-down of 3:2 and/or 2:2 pull-down video signals. The irregularities caused by editing may be termed "bad-edits" while the irregularly displayed patterns may be termed "bad-weaves".

A bad-weave may be encountered, for example, when a change in the pull-down cadence is not detected and appropriately processed, prior to displaying the video. The change in cadence may result from a bad-edit, for example, that corrupts the regular pattern or cadence of the video. A bad-edit may occur, for example, when video is edited after a 3:2 pull-down or 2:2 pull-down has been performed. Any edit that results in a change in the predictability of the cadence of the video may be considered a bad-edit. Such bad-edits may occur when video is incorrectly spliced together. The incorporation of film credits that scroll or fade into the pull-down video may also result in bad-weaves that are unacceptable for display to a viewer. As described herein, the system that detects and corrects these irregularities or distortions is termed a bad-weave detector.

Various aspects of the present invention provide for detecting and correcting pull-down video that provides such unacceptable video. In one example, unacceptable video may be evident as a result of decisions made by an MPEG encoder. For example, titles or subtitles may comprise material that is incorporated into 3:2 or 2:2 pull-down video. If authored with television rather than movie equipment, a movement or fading of such titles and subtitles may occur at each field. However, processing by an MPEG encoder may encode the cadence of the predominantly pull-down video using an indicator that indicates a repeat field in the MPEG bitstream. In this instance, the moving or fading titles may appear to produce bad-weaves and the titles and/or subtitles may appear to proceed backwards or forwards in time. This may occur when the decoded MPEG bitstream is presented to a deinterlacer which detects and reverses the 3:2 pulldown. These irregularities or artifacts may annoy a viewer. If sufficient motion is measured in a repeat field, the field phase would be vetoed. However, in this example, the indicator that indicates a repeat field facilitates the decoding of an identical repeat field, using an MPEG decoder, such that any motion inherent in the moving or fading title is undetectable. As provided by the present invention, the various aspects of the bad-weave detector, its algorithms and architectures, as described with respect to the present invention, is capable of detecting and correcting such annoying irregularities or artifacts.

As described herein, the term "inverse telecine" refers to performing reverse 3:2 and/or reverse 2:2 pull-down of video. The pull-down signal may comprise an interlaced 3:2 and/or 2:2 pull-down video signal. As described herein, the process of performing inverse telecine deinterlacing may comprise performing reverse pull-down and displaying the deinterlaced fields into progressive frames.

Aspects of the present invention may be found in a system and method of preventing a display of one or more bad-weaves by correcting the luminance (or luma) of one or more affected pixels. The correction process occurs at a per-pixel level while performing a reverse pull-down of the video signal. The correction process may comprise a motion adaptive deinterlace process, an inverse telecine process, or an inverse telecine process incorporating a per-pixel corrective process.

Aspects of the present invention may be used with or in addition to one or more representative embodiments described in U.S. patent application Ser. No. 10/945,587 filed Sep. 21, 2004. Accordingly, U.S. patent application Ser. No. 10/945,587 filed Sep. 21, 2004 is hereby incorporated herein by reference in its entirety.

FIG. 1 illustrates a pixel constellation that is used by the bad-weave algorithm while performing inverse telecine, in accordance with an embodiment of the invention. The pixel constellation of FIG. 1 undergoes a sequence of one or more computations that are effectively implemented at the detector processing stage (or phase), in accordance with an embodiment of the invention. In comparison to the MAD-3:2 implementation (as referenced in FIG. 4 of U.S. patent application Ser. No. 10/945,587 filed Sep. 21, 2004, the pixel constellation incorporates additional pixels that are horizontally spaced. For example, additional horizontally spaced pixels corresponding to pixels C, D, H and J are incorporated in this representative embodiment. The spatiotemporal definitions of these pixels in the pixel constellation of FIG. 1 may be defined as follows:

$$C_k = Y_{C_k} = Y(t-1, i-1, j+k) \text{ for } -1 \leq k \leq 1$$

$$D_k = Y_{D_k} = Y(t-1, i+1, j+k) \text{ for } -1 \leq k \leq 1$$

$$H_k = Y_{H_k} = Y(t-3, i-3, j+k) \text{ for } -2 \leq k \leq 2$$

$$J_k = Y_{J_k} = Y(t-3, i+3, j+k) \text{ for } -2 \leq k \leq 2$$

The variable i corresponds to the row, the variable j corresponds to the colunm, of the one or more pixels in a field, and the variable t corresponds to the time, of the pixel constellation. In a representative embodiment, the spatiotemporal definitions defined above reference the value of luminance associated with one or more pixels at coordinates defined by variables t, i, and j. The variables i and j represent vertically and horizontally spatial coordinates, respectively, while the variable t represents the temporal coordinate. As illustrated in FIG. 1, pixel "O", as referenced in the MAD-3:2 architecture of U.S. patent application Ser. No. 10/945,587 filed Sep. 21, 2004, refers to the absent pixel which is being estimated and output in the execution stage or phase. Pixel "P" may be thought of as being the same absent pixel estimated during the detection processing stage or phase. The detection stage precedes the execution stage by two fields.

As was referenced in U.S. patent application Ser. No. 10/945,587 filed Sep. 21, 2004, the abscissa of the pixel constellation is represented by way of discrete indicators t0, t-1, t-2, t-3, etc., shown in the upper portion of FIG. 1. The lettered elements correspond to the pixel constellation. The pixel constellation varies temporally along the abscissa and spatially (in a vertical direction) along the ordinate. The pixel constellation is defined in terms of a third coordinate axis that provides an additional horizontal spatial dimension—this is illustrated by pixels C, D, H, J, E and F in FIG. 1.

The bad-weave detector determines the appropriate correction process to use in preparation for the execution stage or phase. It does this at the detector processing stage which occurs two field periods prior to the execution processing stage. The purpose of the bad-weave detector is to indicate when an inverse telecine directed weave is due to occur in the wrong temporal direction. The process utilized by the bad-weave detector may employ the motion adaptive deinterlace process, inverse telecine directed weave process (or reverse 3:2 (or 2:2) directed weave as described in reference to U.S. patent application Ser. No. 10/945,587, filed Sep. 21, 2004, or an inverse telecine directed weave process that incorporates per-pixel correction. The per-pixel correction may comprise taking a weighted average of the luminance value associated with the inverse telecine directed weave with the luminance value associated with the motion adaptive deinterlace approximation. The motion adaptive deinterlace process, of course, utilizes a motion adaptive spatial/temporal blend.

Various aspects of the invention employed in the one or more algorithms and architectures of the bad-weave detector utilize a first difference computed by subtracting the MAD approximation for a pixel from the luma (or luminance) provided by the weave in the expected direction. This first difference should be small. On the other hand, a second difference is computed by subtracting the MAD approximation for a pixel from the luma provided by the weave in the unexpected direction. This second difference should be large. Comparing the differences corresponding to the expected and unexpected difference values provides an indication of whether the chosen weave direction or expected weave direction is correct. Of course, a standard MAD approximation, using pixel "O", for a pixel occurs in the execution stage (or phase). However, because the bad-weave detector operates in the detection phase, a MAD approximation at the detection phase, using pixel "P", is required. The extended pixel constellation used by the bad-weave detector is illustrated in FIG. 1.

In a representative embodiment, the bad-weave detector computes temporal and spatial approximations in the detection phase using the following equations:

$$Ta_{det} = \frac{(A+B)}{2} \quad \text{(Equation 1, temporal approximation)}$$

$$Sa_{det} = \frac{(C_0+D_0)}{2} \quad \text{(Equation 2, spatial approximation)}$$

In another representative embodiment, one or more other spatial approximations may be utilized, such as that provided using a full diagonal filter, for example, as may be referenced in U.S. patent application Ser. No. 10/945,619 filed Sep. 21, 2004. The temporal and spatial approximations for a pixel may be blended to provide a better approximation. The bad-weave detector may utilize one or more blending functions to blend the temporal and spatial approximations provided by Equation 1 and Equation 2. As may be utilized at the execution stage or phase, the temporal and spatial approximations may be blended as governed by the measured motion to yield $px_{det}$. The following equations may be applied to the aforementioned discussion:

$$X=Ta_{det}, Y=Sa_{det}, M=m_f$$

$$Z=Y-X$$

$$M_L=\text{MAX}\{\text{MIN}(M,Z),-M\}$$

$$px_{det}=\text{Out}=X+M_L$$

The variable X may comprise an approximation for a pixel using the temporal approximation (Equation 1). Y may comprise an approximation using the spatial approximation (Equation 2). As may be referenced in U.S. patent application Ser. No. 10/945,796 filed on Sep. 21, 2004 and U.S. patent application Ser. No. 10/945,817 filed Sep. 21, 2004, the variable M comprises the amount of motion measured while $m_f$ refers to the final motion measured. In the absence of motion, the output may be weighted to the temporal approximation, as specified in Equation 1. If an abundance of motion is measured, the output, $px_{det}$, may be weighted to the spatial approximation, as specified in Equation 2. When a moderate amount of motion is determined, the output, $px_{det}$, will be somewhere in between the temporal and spatial approximations.

An inverse telecine approximation for absent pixel P may be determined by determining the direction of the temporal weave in either a 3:2 pull-down or 2:2 pull-down. The direction of the weave used at the detection stage (or phase) is consistent with the direction of the weave that is used in the execution stage. In the case of 3:2 pull-down, the luma (or luminance) selected for absent pixel P in the detection stage comprises the values shown in Table 1. A and B as indicated in Table 1 correspond to A and B as represented in the pixel constellation shown in FIG. 1.

TABLE 1

Reverse 3:2 Directed Weave Approximation for Absent Pixel P

| 3:2 Field Phase Detector | Weave Direction | Luma selected for absent pixel P |
|---|---|---|
| 0 | Backwards | B |
| 1 | Forwards | A |
| 2 | Backwards | B |
| 3 | Forwards | A |
| 4 | Average | (A + B)/2 |

In the case of 2:2 pull-down, the luma selected for absent pixel P in the detection stage comprises the values shown in Table 2. Likewise, A and B as indicated in Table 2 correspond to A and B as represented in the pixel constellation shown in FIG. 1.

TABLE 2

Reverse 2:2 Directed Weave Approximation for Absent Pixel P

| 2:2 Field Phase Detector | Weave Direction | Luma selected for absent pixel P |
|---|---|---|
| 0 | Backwards | B |
| 1 | Forwards | A |

Let $IT_{det}$ be the luma selected for absent pixel "P" assuming the expected or correct weave direction for the current field phase.

The weave directions that correspond to the unexpected or opposite weave direction for absent pixel P are shown in Table 3 and Table 4 for 3:2 and 2:2 pull-down video respectively. Of course, the weave direction is opposite to that shown in Table 1.

TABLE 3

Opposite Reverse 3:2 Directed Weave Approx. for Absent Pixel P

| 3:2 Field Phase Detector | Opposite Weave Direction | Luma selected for absent pixel P |
|---|---|---|
| 0 | Forwards | A |
| 1 | Backwards | B |
| 2 | Forwards | A |
| 3 | Backwards | B |
| 4 | Average | (A + B)/2 |

In the case of 2:2 pull-down, the luma selected for absent pixel P in the detection stage is as shown in Table 4. Likewise, the direction of the weave is opposite to that shown in Table 2.

TABLE 4

Opposite Reverse 2:2 Directed Weave Approx. for Absent Pixel P

| 2:2 Field Phase Detector | Opposite Weave Direction | Luma selected for absent pixel P |
|---|---|---|
| 0 | Forwards | A |
| 1 | Backwards | B |

Let opposite_$IT_{det}$ be the luma selected for absent pixel "P" assuming the unexpected or opposite weave direction for the current field phase.

According to various aspects of the invention, the tendency or measure of a pull-down video to conform to an opposite weave or unexpected weave may be expressed using any equation that indicates or correlates the unexpectedness of $IT_{det}$ and $px_{det}$. In a representative embodiment, the following exemplary equation may be used as a measure of a pull-down video that correlates well with an unexpected weave:

$$\text{opposite\_weave}_{det} = \text{abs}(IT_{det} - px_{det}) - \text{abs}(\text{opposite\_}IT_{det} - px_{det}) \quad \text{(Equation 3)}$$

When performing reverse 3:2 pull-down with the bad-weave detector in field phase 4, $IT_{det}$ and opposite_$IT_{det}$ are equivalent as may be seen using Table 1 and Table 3. In a representative embodiment, the measure of the opposite weave is instead implemented by way of the following equation:

$$\text{opposite\_weave}_{det} = \text{abs}(IT_{det} - px_{det}) \quad \text{(Equation 4)}$$

In Equation 3, $IT_{det}$ and $px_{det}$ will be very similar when the expected weave direction is the correct direction to use, while the absolute value of opposite_$IT_{det}$ minus $px_{det}$ will be a large value. Hence, computation of opposite_weave$_{det}$ may generate a negative value or small value for Equation 3. On the other hand, $IT_{det}$ and $px_{det}$ will be very dissimilar when the unexpected (or opposite) weave direction is the correct direction to use, while the absolute value of opposite_$IT_{det}$ minus $px_{det}$ will be a small value. As a consequence, opposite_weave$_{det}$ may compute to a high value or very positive value.

The measure of the tendency toward the opposite or unexpected weave by way of opposite_weave$_{det}$ may be affected when the video frame exhibits high vertical detail. In the presence of high vertical detail, the spatial approximation given by Equation 2 may be suboptimal. When video contains motion in the presence of high vertical detail, opposite_weave$_{det}$ may be inappropriately high. As a consequence, opposite_weave$_{det}$ may be adjusted by accounting for the high vertical detail. As a remedy to prevent opposite_weave$_{det}$ from providing false positive readings, the local detail may be taken into account. Since it is impossible to determine the presence of high vertical detail at absent pixel P, the detail in the present pixels surrounding P are examined and utilized instead. In a representative embodiment, one or more present pixels surrounding P are used to determine the amount of high detail provided by pixel P. The following exemplary equations may be used to measure the surrounding detail, in both the vertical and horizontal directions.

$$\text{vert\_detail}_{det} = \text{MAX}\{\text{abs}(C_{-1} - D_{-1}), \text{abs}(C_0 - D_0), \text{abs}(C_1 - D_1)\} \quad \text{(Equation 5)}$$

$$C\_\text{range} = \text{MAX}\{C_{-1}, C_0, C_1\} - \text{MIN}\{C_{-1}, C_0, C_1\}$$

$$D\_\text{range} = \text{MAX}\{D_{-1}, D_0, D_1\} - \text{MIN}\{D_{-1}, D_0, D_1\}$$

$$\text{horiz\_detail}_{det} = \text{MAX}\{C\_\text{range}, D\_\text{range}\} \quad \text{(Equation 6)}$$

The tendency of a pull-down video to conform to an opposite weave or unexpected weave may now be measured by the following equation, which incorporates the vertical and horizontal detail surrounding pixel P.

$$IT\_\text{diff}_{det} = \text{opposite\_weave}_{det} - \text{MAX}\{\text{vert\_detail}_{det}, \text{horiz\_detail}_{det}\} \quad \text{(Equation 7)}$$

$IT\_\text{diff}_{det}$, as defined by Equation 7 above may be a large positive number if, during the inverse telecine process, the opposite or unexpected weave direction provides a better choice than the expected direction due to be chosen at the execution stage.

In a representative embodiment, a measure of the frame inverse telecine difference may be provided by way of the following exemplary equation:

$$\text{Frame\_IT\_diff}_{det} \mathrel{+}= \begin{cases} 0 & \text{when} -255 \le IT\_\text{diff}_{det} < 4 \\ 1 & \text{when } 4 \le IT\_\text{diff}_{det} < 8 \\ 4 & \text{when } 8 \le IT\_\text{diff}_{det} < 16 \\ 8 & \text{when } 16 \le IT\_\text{diff}_{det} < 32 \\ 16 & \text{when } 32 \le IT\_\text{diff}_{det} \le 255 \end{cases} \quad \text{(Equation 8)}$$

The values provided by $IT\_\text{diff}_{det}$ are summed over all absent pixel positions in the image to give a measure of the extent of the incorrect weaving on a frame by frame basis. The value for Frame_IT_diff$_{det}$ is reset or zeroed after computation is performed for each frame. When Frame_IT_diff$_{det}$ is a large value, it may indicate that there are many pixels that will be weaved in the wrong direction, unless corrective action is made prior to displaying the pixels. Since this measurement is performed at the detection stage or phase, Frame_IT_diff$_{det}$ may be compared with one or more threshold values and appropriate corrective action may be made before the artifacts reach the execution stage and are displayed to the viewer. If the value of $Frame\_IT\_diff_{det}$ is greater than a threshold, termed BWVD_UNLOCK_THRESH, for example, a bad-edit may be considered to have occurred, which may result in a bad-weave. As a consequence, the execution stage or phase processing hardware may be alerted and made to process pixels using a motion adaptive deinterlace (MAD) process instead of using an inverse telecine process. Additionally, all counters associated with a phase lock detector (e.g., a 3:2 phase lock detector or 2:2 phase lock detector) may be reset to zero. Hence, in a representative embodiment, a MAD process is used to determine the pixel luma when the value of $Frame\_IT\_diff_{det}$ is greater than a certain threshold. This threshold, BWVD_UNLOCK_THRESH, may comprise a programmable threshold.

When field phase 4 is encountered during inverse telecine processing of 3:2 pull-down video, it may be easily seen that $IT_{det}$ and $opposite\_IT_{det}$ have the same value. As a result, the modified equation given by Equation 4 may be used in this specific case. Compared to the general case, the resulting measure is less robust since it no longer benefits from the differential behavior exhibited between $IT_{det}$ and $opposite\_IT_{det}$. The bad-weave detector may be adapted to provide a separate programmable threshold, termed BWVD_PH4_UNLOCK_THRESH, for example, which may be used for triggering a bad-edit occurrence in field phase 4. In a representative embodiment, the BWVD_PH4_UNLOCK_THRESH threshold, which may be programmable, may be set at a higher value than the BWVD_UNLOCK_THRESH threshold, such that erroneous triggering is minimized.

In a representative embodiment, a similar scheme as provided by the bad-weave detector used in the detection stage (or phase) may be used in the execution stage (or phase) to correct bad-weave on a per-pixel basis at display time. This may be used in conjunction with the per-pixel unexpected motion methods employed during the execution stage as provided using MAD-3:2. In a representative embodiment, a control signal referred to as IT_mode, for example, has four values {OFF, FWD, BWD, AVG}. In this context, the luma value that it is associated with is named $IT_{exe}$. When IT_mode is OFF, the value of $IT_{exe}$ is immaterial since inverse telecine is not performed. In a representative embodiment, two equations for describing the unexpected or opposite weave may be used at the execution stage. The first equation may be used to describe the unexpected weave for phases 0, 1, 2, and 3 while the second equation may be used to describe the unexpected weave for phase 4. In the general case (for phases 0, 1, 2, 3), $px_{exe}$ is the actual MAD approximation for absent pixel "O". As was described earlier in reference to the detector stage, the tendency of a pull-down video to conform to an opposite weave or unexpected weave may be expressed using the equation, $opposite\_weave_{exe}=abs(IT_{exe}-px_{exe})-abs(opposite\_IT_{exe}-px_{exe})$, which is similar to Equation 3. In the specific case where IT_mode is set to AVG (e.g., field phase 4), the following equation applies: $opposite\_weave_{exe}=abs(IT_{exe}-px_{exe})$. Similar to the methods used in the detection stage, localized measures of detail horizontally and vertically around absent pixel "O" are used to reduce the occurrence of erroneous or inappropriate triggering due to high vertical detail at pixel "O". Using additional pixels available in the pixel constellation at the execution stage, vertical detail may be measured above and below, in addition to around "O", using the following equations:

$$vert\_upper\_detail_{exe}=MAX\{abs(H_{-1}-E_{-1}), abs(H_0-E_0), abs(H_1-E_1)\}$$

$$vert\_center\_detail_{exe}=MAX\{abs(E_{-1}-F_{-1}), abs(E_0-F_0), abs(E_1-F_1)\}$$

$$vert\_lower\_detail_{exe}=MAX\{abs(F_{-1}-J_{-1}), abs(F_0-J_0), abs(F_1-J_1)\}$$

In a representative embodiment, combining the above referenced equations provides a final measure of vertical detail that allows for a more robust measure, as expressed using the following equation:

$$vert\_detail_{exe}=MAX\{vert\_center\_detail_{exe}, MIN(vert\_upper\_detail_{exe}, vert\_lower\_detail_{exe})\}$$

Horizontal detail in the execution stage is defined using the following equations:

$$E\_range=MAX\{E_{-1}, E_0, E_1\}-MIN\{E_{-1}, E_0, E_1\}$$

$$F\_range=MAX\{F_{-1}, F_0, F_1\}-MIN\{F_{-1}, F_0, F_1\}$$

$$horiz\_detail_{exe}=MAX\{E\_range, F\_range\}$$

In a representative embodiment, the horizontal detail of pixel clusters H and J may be deliberately omitted. In this embodiment, it may be shown experimentally that inclusion of the horizontal detail of pixel clusters H and J may unduly reduce the ability to correct certain bad-weave pixels without particularly reducing the number of pixels erroneously earmarked for correction.

Using the aforementioned equations, the opposite weave measure in the execution stage (or phase) corrected for high vertical detail may be given by the following equation.

$$IT\_diff_{exe}=opposite\_weave_{exe}-MAX\{vert\_detail_{exe}, horiz\_detail_{exe}\} \quad \text{(Equation 9)}$$

A per-pixel bad-weave motion value, ppbwv may be derived from $IT\_diff_{exe}$ after thresholding and scaling (or coring and multiplying by a gain factor). The following equation may be used to generate ppbwv:

$$ppbwv = \begin{cases} 0 & \text{when } IT\_diff_{exe} < ppbwv\_thresh \\ ppbwv\_gain \cdot IT\_diff_{exe} & \text{when } IT\_diff_{exe} \geq ppbwv\_thresh \end{cases} \quad \text{(Equation 10)}$$

Figure 2:
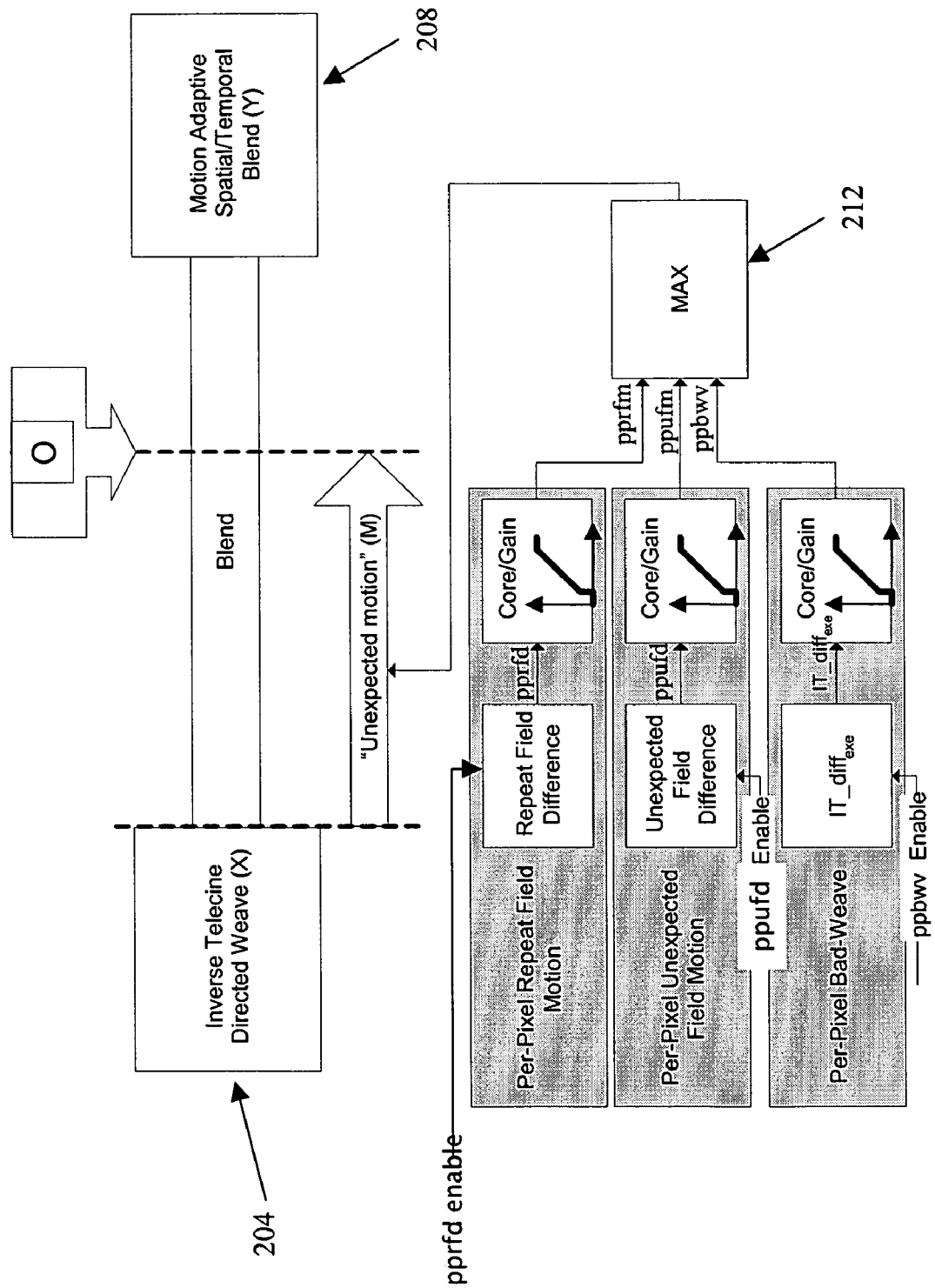
FIG. 2 is a block diagram illustrating a blend or merging of the inverse telecine directed weave (or reverse 3:2 (or 2:2)) process and the motion adaptive deinterlace process used for generating one or more output pixel luma, in accordance with an embodiment of the invention.

The threshold, ppbwv_thresh, used to obtain ppbwv may be any number determined experimentally. The gain, ppbwv_gain, may comprise the integer values 1, 2, 4, and 8, although it is contemplated any number or value may be used. The ppbwv may be used, along with the other per-pixel unexpected motion measures (such as pprfm and/or ppufm) to bias the output pixel "O" towards the motion adaptive approximation rather than the inverse-telecine approximation. In a direct extension to determining the overall "unexpected motion", the ppbwv measure may be included by taking the maximum reading from the three available (and enabled) measures, pprfm, ppufm, and ppbwv, as shown in FIG. 2. Although the value of ppbwv may comprise any value, in this representative embodiment, ppbwv ranges from 0 to 255.

FIG. 2 is a block diagram illustrating a blending or merging of the inverse telecine directed weave (or reverse 3:2 (or 2:2)) process 204 and the motion adaptive deinterlace process 208 used for generating one or more output pixel luma, in accordance with an embodiment of the invention. For each output absent pixel, O, these two processes 204, 208 may be blended to generate an approximation for the luma for the output absent pixel, O. The reverse 3:2 weave process 204 comes from the directed weave governed by the current field phase; which in turn has been determined from the 3:2 (or 2:2) pull-down cadence lock. The motion adaptive deinterlace process 208 comes from the blend of the spatial and temporal averages (as previously described), as governed by the amount of motion measured. In a representative embodiment, each of three available measures—per-pixel repeat field motion (pprfm), per-pixel unexpected field motion (ppufm), and per-pixel bad weave motion (ppbwv) may be associated with one or more control signals. Each of these three available measures may be enabled or disabled using control signals, referred to as ppufm enable, pprfm enable, and ppbwv enable, for example. In a representative embodiment, the maximum of the per-pixel repeat field motion, per-pixel unexpected field motion, and per-pixel bad-weave motion is determined by the following equation, as illustrated by a MAX function block 212 in FIG. 2:

$$ppum = \text{MAX}(pprfm, ppufm, ppbwv) \qquad \text{(Equation 11)}$$

Each of the measures is controlled by way of ppufm enable, pprfm enable, and ppbwv enable. The value ppum is the value that is then used to determine the merge point between the inverse telecine directed weave and the motion adaptive deinterlace (MAD) approximations of each output pixel O, as shown in FIG. 2. In a representative embodiment, ppum is used to generate a weighted average of the reverse 3:2 and the MAD approximations of each output pixel. As indicated by the equation for ppum and illustrated in FIG. 2, the MAX function block 212 may comprise circuitry that generates the maximum of three values, such as that provided by pprfm, ppufm, and that provided by ppbwv. The control signals, ppufm enable, pprfm enable, and ppbwv enable, may be programmed to one or more states. In a representative embodiment, the control signals may comprise the following four states: 00 (Off), 01 (On), 10 (Auto), and 11 (Auto_All). When a control signal is programmed to the 00 (Off) state, it disables its corresponding measure. Therefore, its corresponding measure is set to zero. As a consequence, the MAX function block 212 will receive a zero input. On the other hand, when a control signal is programmed to the 01 (On) state, its corresponding measure will be transmitted to the MAX function block 212. In a representative embodiment, when either the ppufm enable or pprfm enable is programmed to the 10 (Auto) state, a reverse 3:2 directed weave (or inverse telecine directed weave) with per-pixel correction is performed when the repeat field motion (repf_motion) exceeds a first threshold but is below a second threshold. As referenced in U.S. patent application Ser. No. 10/945,587 filed Sep. 21, 2004, per-pixel correction is performed when the measured motion in a repeat field (repf_motion) exceeds a threshold termed the REPF_PIX_CORRECT_LEVEL (P) but remains below a threshold termed the REPF_PIX_VETO_LEVEL (V). In the event 2:2 pull-down is detected and processed, decision metrics incorporating the use of a repeat field are bypassed (since there is no repeat field); as a result, the pprfm measure may be set to zero. In this instance, equation 11 ignores the pprfm measure when computing the maximum. In a representative embodiment, when the ppbwv enable is programmed to the 10 (Auto) state, per-pixel correction is performed when a frame inverse telecine difference (i.e., $\text{Frame\_IT\_diff}_{det}$ as will be described in reference to FIG. 3) exceeds a first threshold termed a BWVD_DETECT_THRESH (or BWVD_PH4_DETECT_THRESH) level but is below a second threshold termed a BWVD_UNLOCK_THRESH (or BWVD_PH4_UNLOCK_THRESH) level. When a control signal is programmed to the 11 (Auto All) state, a reverse 3:2 directed weave (or inverse telecine directed weave) with per-pixel correction is utilized if either the repf_motion exceeds the REPF_PIX_CORRECT_LEVEL (P) but remains below the REPF_PIX_VETO_LEVEL (V) or the frame inverse telecine difference (i.e., $\text{Frame\_IT\_diff}_{det}$ as will be shortly described in reference to FIG. 3) exceeds the BWVD_DETECT_THRESH (or BWVD_PH4_DETECT_THRESH) level but is below the BWVD_UNLOCK_THRESH (or BWVD_PH4_UNLOCK_THRESH) level.

Figure 3:
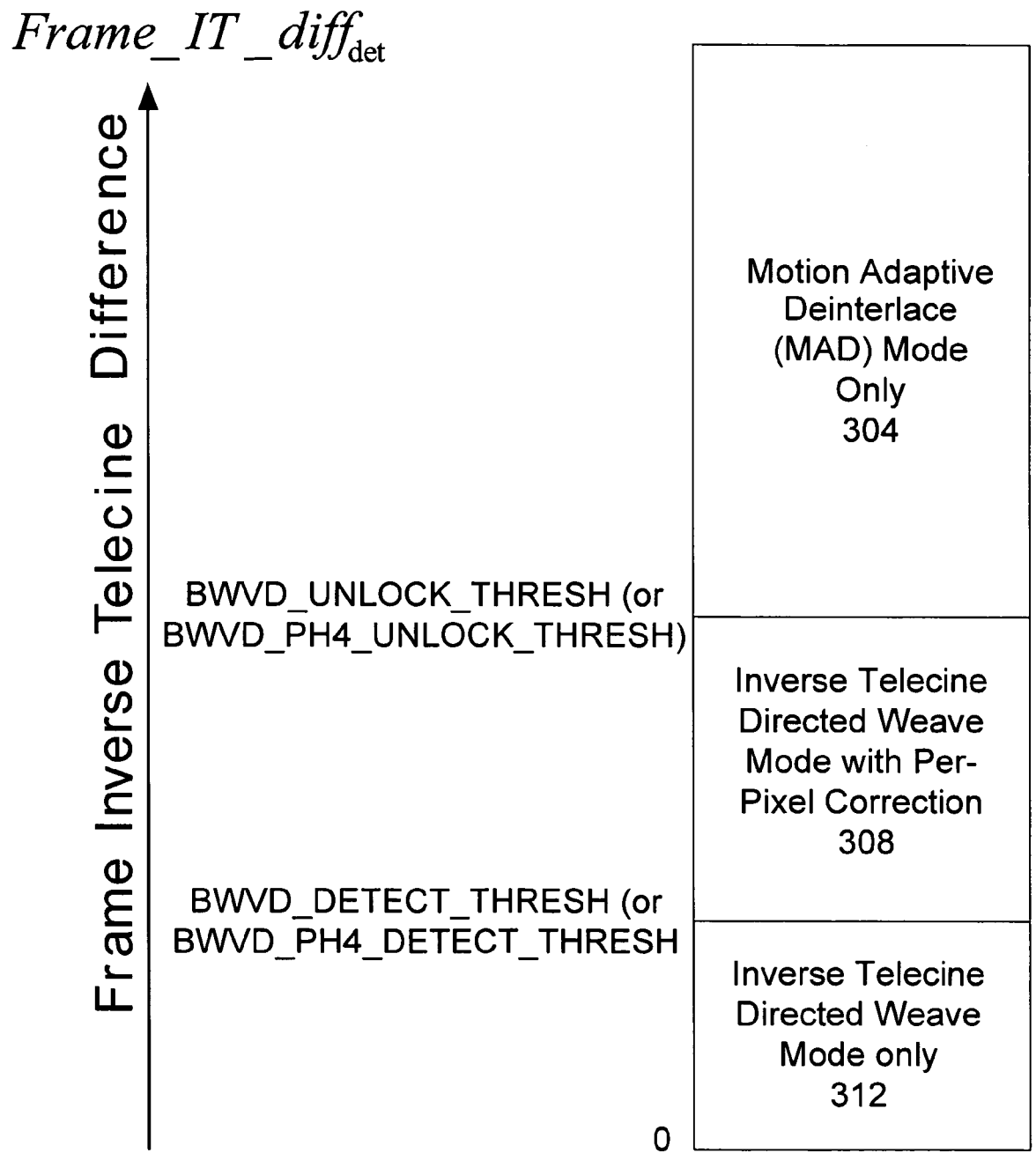
FIG. 3 is a block diagram illustrating three possible modes of operation for the bad-weave detector at the execution phase, that are automatically activated as a function of frame inverse telecine difference, in accordance with an embodiment of the invention.

FIG. 3 is a block diagram illustrating three possible modes of operation of the bad-weave detector, that may be activated as a function of frame inverse telecine difference, in accordance with an embodiment of the invention. The three possible modes comprise a motion adaptive deinterlace mode 304, an inverse telecine directed weave that incorporates per-pixel correction 308, and an inverse telecine directed weave mode 312. The intermediate mode 308, shown in FIG. 3, incorporates per-pixel correction using a blend of the inverse telecine directed weave (or reverse 3:2 (or 2:2)) process and the motion adaptive deinterlace process. It may be advantageous to only turn on the per-pixel correction when it appears there are pixels to correct. In this intermediate mode, phase lock is maintained and those pixels exhibiting interlaced motion, as determined by a calculation of ppufm, pprfm, and ppbwv, may be corrected using the blending process as was illustrated in FIG. 2. In the embodiment illustrated in FIG. 3, the calculated value of the frame inverse telecine difference, $\text{Frame\_IT\_diff}_{det}$, is compared against two threshold levels by the bad-weave detector—BWVD_UNLOCK_THRESH (or BWVD_PH4_UNLOCK_THRESH in the specific case of 3:2 pull-down video during field phase 4), representing the higher of the two thresholds, and BWVD_DETECT_THRESH (or BWVD_PH4_DETECT_THRESH in the specific case of 3:2 pull-down video during field phase 4), representing the lower of the two thresholds. The two threshold levels are used to transition between the three different modes, as illustrated in FIG. 3. In the embodiment of FIG. 3, threshold comparisons are computed for each field. In a representative embodiment, only for those frames in which the value of $\text{Frame\_IT\_diff}_{det}$ falls within the intermediate mode is the inverse telecine directed weave mode with per-pixel correction utilized for processing in the subsequent execution stage.

If the value of $\text{Frame\_IT\_diff}_{det}$ is less than BWVD_DETECT_THRESH (or BWVD_PH4_DETECT_THRESH), the blending process as described previously is disabled. If $\text{Frame\_IT\_diff}_{det}$ is larger than BWVD_DETECT_THRESH (or BWVD_PH4_DETECT_THRESH) but lower than BWVD_UNLOCK_THRESH (or BWVD_PH4_UNLOCK_THRESH), the blending process is enabled while performing an inverse telecine directed weave. If the value of $\text{Frame\_IT\_diff}_{det}$ is greater than BWVD_UNLOCK_THRESH (or BWVD_PH4_UNLOCK_THRESH), then this phase is vetoed, the phase lock is removed, and the deinterlacer reverts to motion adaptive deinterlace (MAD) mode. These concepts are summarized in the block diagram of FIG. 3.

Figure 4:
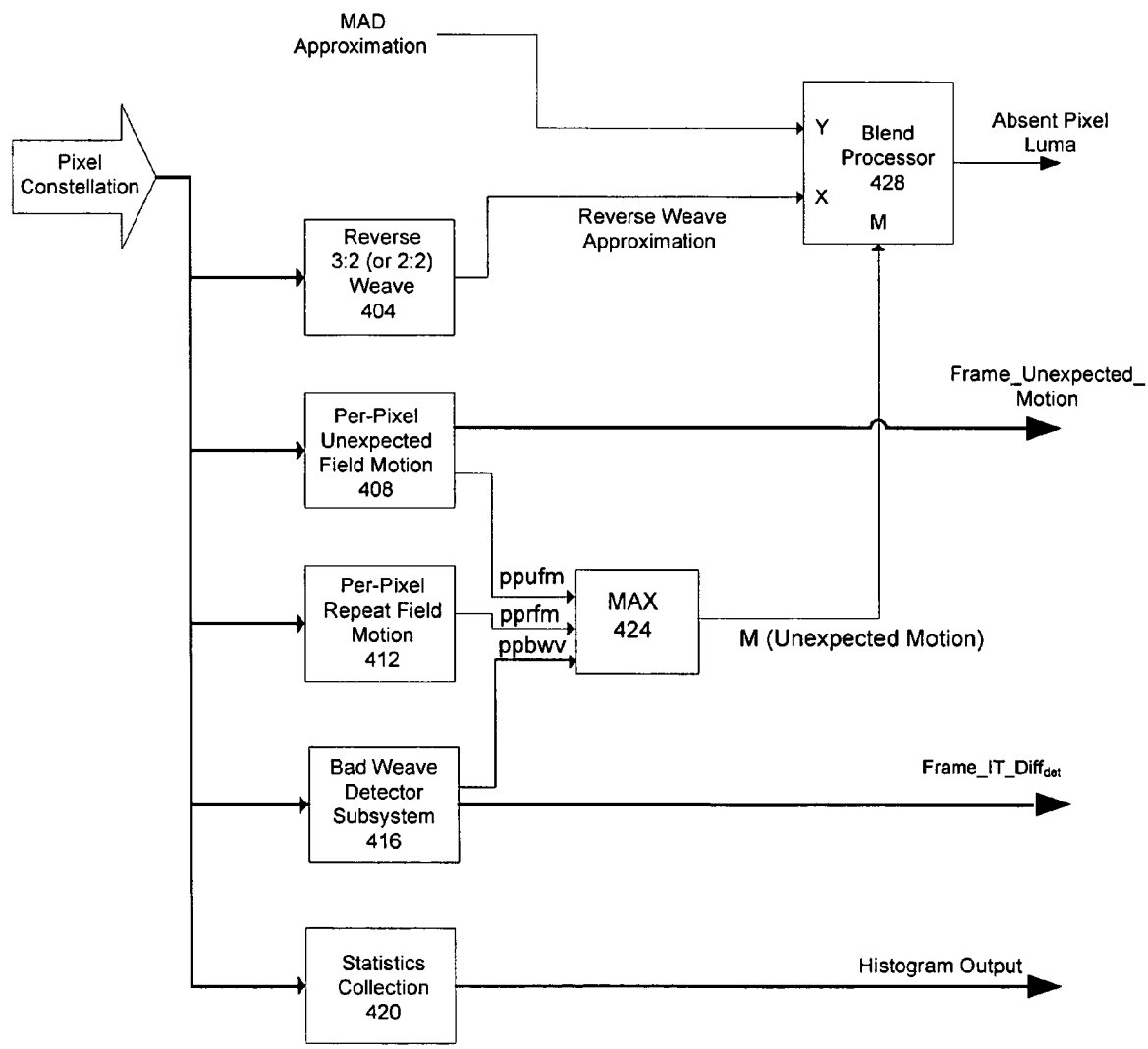
FIG. 4 is a block diagram illustrating a bad-weave detector subsystem in accordance with an embodiment of the invention.

FIG. 4 is a block diagram illustrating a bad-weave detector subsystem in accordance with an embodiment of the invention. The bad-weave detector subsystem is located within a pixel computation system that is used to generate absent pixel luma when generating progressive video from pull-down video. The pixel computation system contains several computation subsystems used in the processing of the absent pixel luma. The pixel computation system comprises a reverse 3:2 (or 2:2) weave subsystem 404, a per-pixel unexpected field motion (ppufm) subsystem 408, a per-pixel repeat field motion (pprfm) subsystem 412, a bad-weave detector subsystem 416, a statistics collection subsystem 420, and an unexpected motion subsystem (that generates the maximum of up to three values) 424, and a blend processor 428. The ppufm subsystem 408 generates the per-pixel unexpected field motion (ppufm), the pprfm subsystem 412 generates pprfm, while the bad weave detector subsystem 416 generates ppbwv, so that the unexpected motion subsystem 424 may be used to generate the maximum of ppufm, pprfm, and ppbwv values. The reverse 3:2 (or 2:2) weave subsystem 404 provides a reverse directed weave approximation of the absent pixel luma. The statistics collection subsystem 420 generates histogram values and computes sigma values. As illustrated, the output, M, provided by the unexpected motion subsystem 424 is used to control the blend in the blend processor 428. The blend processor 428 (whose operations were discussed in reference to FIG. 2) receives a motion adaptive deinterlace (MAD) input and a reverse weave approximation input. The blend processor 428 blends the inputs in proportions controlled by M. The subsystems 404, 408, 412, 416, 420, 424, and 428 that comprise the pixel computation system may comprise circuitry such as digital and analog circuitry, capable of implementing the system shown in FIG. 4. As illustrated, the bad weave detector subsystem 416 computes and outputs the frame inverse telecine difference (Frame_IT_$\text{Diff}_{det}$). Each of the subsystems 404, 408, 412, 416, 420, 424 and the blend processor 428 may comprise one or more circuitries that compute and generate the various outputs illustrated in FIG. 4. Further, one or more sets of software instructions resident in one or more memories of the one or more circuitries may be used to compute and generate the various outputs illustrated in FIG. 4. A processor located in the one or more circuitries may be used to execute the one or more sets of software instructions. For example, ppufm, pprfm, ppbwv, Frame_Unexpected_Motion, Frame_IT_$\text{Diff}_{det}$, and Histogram Output comprise outputs that are computed and generated by the one or more circuitries or by way of executing the one or more sets of software instructions. The one or more various equations used to generate Frame_IT_$\text{Diff}_{det}$, as described herein, may be computed using the one or more circuitries and/or by executing the one or more sets of software instructions.

The variables $\text{IT}_{det}$, opposite_$\text{IT}_{det}$, and opposite_$\text{weave}_{det}$ that were previously described may be summarized as shown in Table 5 below, based on numerical index or inverse telecine weave mode.

TABLE 5 opposite_$\text{weave}_{det}$ for each of the three weave types

| Numerical index | Inverse telecine weave mode | $\text{IT}_{det}$ = | opposite_$\text{IT}_{det}$ = | opposite_$\text{weave}_{det}$ = |
|---|---|---|---|---|
| 0 | Backwards | B | A | $\text{abs}(\text{IT}_{det} - \text{px}_{det}) - \text{abs}(\text{opposite\_IT}_{det} - \text{px}_{det})$ |
| 1 | Forwards | A | B | $\text{abs}(\text{IT}_{det} - \text{px}_{det}) - \text{abs}(\text{opposite\_IT}_{det} - \text{px}_{det})$ |
| 2 | Average | $\frac{(A+B)}{2}$ | Don't care | $\text{abs}(\text{IT}_{det} - \text{px}_{det})$ |

Similarly, the variables $\text{IT}_{det}$, opposite_$\text{IT}_{det}$, opposite_$\text{weave}_{det}$ that were previously described may be summarized as shown in Table 6 below, based on a control signal which indicates the direction of the pull-down weave, referred to as IT_mode.

TABLE 6 opposite_$\text{weave}_{det}$ based on current IT_mode value

| IT_mode | $\text{IT}_{exe}$ | opposite_$\text{IT}_{exe}$ | opposite_$\text{weave}_{exe}$ |
|---|---|---|---|
| OFF | Don't care | Don't care | Don't care |
| FWD | B | G | $\text{abs}(\text{IT}_{exe} - \text{px}_{exe}) - \text{abs}(\text{opposite\_IT}_{exe} - \text{px}_{exe})$ |
| BWD | G | B | $\text{abs}(\text{IT}_{exe} - \text{px}_{exe}) - \text{abs}(\text{opposite\_IT}_{exe} - \text{px}_{exe})$ |
| AVG | $\frac{(B+G)}{2}$ | Don't care | $\text{abs}(\text{IT}_{exe} - \text{px}_{exe})$ |

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. A method of detecting and correcting irregularities when performing an inverse telecine deinterlacing of pull-down video, said method comprising:
   determining a first pixel luminance of an absent pixel using a luminance generated from one or more present pixels, said one or more present pixels having the same spatial coordinates of said absent pixel, each of said one or more present pixels associated with a corresponding first pixels field, said first pixels field determined by temporally weaving in an expected weave direction;
   determining a second pixel luminance of said absent pixel using a luminance generated from one or more present pixels, said one or more present pixels having the same spatial coordinates of said absent pixel, each of said one or more present pixels associated with a corresponding second pixels field, said second pixels field determined by temporally weaving in an unexpected or opposite weave direction; and determining a first luminance approximation for said absent pixel.

2. The method of claim 1 wherein said first luminance approximation comprises a blend of a spatial computation and a temporal computation of said absent pixel.

3. The method of claim 2 wherein said spatial computation comprises computing an average of two present pixels, wherein said two present pixels comprise a first present pixel positioned one unit above said absent pixel in a spatially vertical direction, and a second present pixel positioned one unit below said absent pixel in said spatially vertical direction, said first present pixel and said second present pixel having identical temporal and horizontally spatial coordinates.

4. The method of claim 3 wherein said temporal computation comprises computing an average of two present pixels, wherein said two present pixels comprises a third present pixel that precedes said absent pixel by one unit in time, and a fourth present pixel that follows said absent pixel by one unit in time, said third present pixel and said fourth present pixel having identical horizontal and vertical spatial coordinates.

5. The method of claim 2 wherein said temporal computation comprises computing an average of two present pixels, wherein said two present pixels comprise a first present pixel that precedes said absent pixel by one unit in time, and a second present pixel that follows said absent pixel by one unit in time, said first present pixel and said second present pixel having identical horizontal and vertical spatial coordinates.

6. The method of claim 1 further comprising:
computing a first difference between said first pixel luminance and said first luminance approximation;
computing a second difference between said second pixel luminance and said first luminance approximation; and
computing a third difference by subtracting an absolute value of said second difference from an absolute value of said first difference.

7. The method of claim 6 further comprising:
computing a second luminance approximation using vertical detail adjacent to said absent pixel;
computing a third luminance approximation using horizontal detail adjacent to said absent pixel;
determining a maximum of said second luminance approximation and said third luminance approximation; and
computing a fourth difference by subtracting said maximum from said third difference.

8. The method of claim 7 further comprising computing an absolute value of a fifth difference, said fifth difference obtained by subtracting said maximum from said first difference, said absolute value of said fifth difference used when said pull-down video comprises 3:2 pull-down video and said absent pixel is obtained from a field that is temporally positioned between two repeat fields of said 3:2 pull-down video.

9. The method of claim 8 wherein said second luminance approximation comprises:
computing an absolute value of a sixth difference between the luminance of a first present pixel and the luminance of a second present pixel, said first present pixel positioned one unit above said absent pixel in a spatially vertical direction, and said second present pixel positioned one unit below said absent pixel in said spatially vertical direction, said first present pixel and said second present pixel having identical temporal coordinates and identical first horizontally spatial coordinates;

computing an absolute value of a seventh difference between the luminance of a third present pixel and the luminance of a fourth present pixel, said third present pixel positioned one unit above said absent pixel in a spatially vertical direction, and said fourth present pixel positioned one unit below said absent pixel in said spatially vertical direction, said third present pixel and said fourth present pixel having said identical temporal coordinates and identical second horizontally spatial coordinates;

computing an absolute value of an eighth difference between the luminance of a fifth present pixel and the luminance of a sixth present pixel, said fifth present pixel positioned one unit above said absent pixel in a spatially vertical direction, and said sixth present pixel positioned one unit below said absent pixel in said spatially vertical direction, said fifth present pixel and said sixth present pixel having said identical temporal coordinates and identical third horizontally spatial coordinates, said first horizontally spatial coordinates positioned one unit in a negative direction from said second horizontally spatial coordinates, said third horizontally spatial coordinates positioned one unit in a positive direction from said second horizontally spatial coordinates; and determining a first largest value from said absolute value of said sixth difference, said absolute value of said seventh difference, and said absolute value of said eighth difference, wherein said second luminance approximation is equal to said first largest value.

10. The method of claim 9 wherein said third luminance approximation comprises:
determining a first maximum of said luminance of said first present pixel, said luminance of said third present pixel, and said luminance of said fifth present pixel;
determining a second maximum of said luminance of said second present pixel, said luminance of said fourth present pixel, and said luminance of said sixth present pixel;
determining a first minimum of said luminance of said first present pixel, said luminance of said third present pixel, and said luminance of said fifth present pixel;
determining a second minimum of said luminance of said second present pixel, said luminance of said fourth present pixel, and said luminance of said sixth present pixel;
computing an eighth difference by subtracting said first minimum from said first maximum;
computing a ninth difference by subtracting said second minimum from said second maximum; and
determining a second largest value of said eighth difference and said ninth difference, wherein said third luminance approximation is equal to said second largest value.

11. The method of claim 10 wherein said fourth difference is obtained for each said absent pixel in an entire field of said pull-down video and is used to generate a frame inverse telecine difference value.

12. The method of claim 11 wherein said frame inverse telecine difference value is obtained using the equation, $$\text{Frame\_IT\_diff}_{det} \mathrel{+}= \begin{cases} 0 & \text{when} -255 \le \text{IT\_diff}_{det} < 4 \\ 1 & \text{when } 4 \le \text{IT\_diff}_{det} < 8 \\ 4 & \text{when } 8 \le \text{IT\_diff}_{det} < 16 \\ 8 & \text{when } 16 \le \text{IT\_diff}_{det} < 32 \\ 16 & \text{when } 32 \le \text{IT\_diff}_{det} \le 255 \end{cases} \quad . \quad 5$$

13. The method of claim 12 further comprising:
first comparing said frame inverse telecine difference value to a first threshold;
second comparing said frame inverse telecine difference value to a second threshold;
processing said pull-down video by said temporally weaving in one or more expected weave directions if said frame inverse telecine difference value is less than said first threshold;
processing said pull-down video using a blend of said temporally weaving in one or more expected weave directions and a motion adaptive deinterlace process if said frame inverse telecine difference value is greater than said first threshold but less than a second threshold; and
processing said pull-down video using said motion adaptive deinterlace process if said frame inverse telecine difference value is greater than said second threshold.

14. The method of claim 13 wherein said blend is determined by determining the maximum of one or more measures, said one or more measures enabled using one or more control signals.

15. The method of claim 14 wherein said one or more control signals may be enabled if said frame inverse telecine difference value is greater than said first threshold but less than said second threshold.

16. A method of detecting whether an inverse telecine weave is expected to be processed in an incorrect temporal direction comprising:
determining a first pixel luminance of an absent pixel using a luminance generated from one or more first present pixels;
determining a second pixel luminance of said absent pixel using a luminance generated from one or more second present pixels;
determining a luminance approximation for said absent pixel;
computing a first difference between said first pixel luminance and said luminance approximation;
computing a second difference between said second pixel luminance and said luminance approximation; and
computing a third difference by subtracting an absolute value of said second difference from an absolute value of said first difference.

17. A system for detecting and correcting irregularities when performing an inverse telecine deinterlacing of pull-down video, said system comprising:
a first circuitry for determining a first pixel luminance of an absent pixel using a luminance generated from one or more first present pixels, said one or more first present pixels having the same spatial coordinates of said absent pixel, each of said one or more first present pixels associated with a corresponding first pixels field, said first pixels field determined by temporally weaving in an expected weave direction; and
a second circuitry for determining a second pixel luminance of said absent pixel using a luminance generated from one or more second present pixels, said one or more second present pixels having the same spatial coordinates of said absent pixel, each of said one or more second present pixels associated with a corresponding second pixels field, said second pixels field determined by temporally weaving in an unexpected or opposite weave direction.

18. The system of claim 17 further comprising a third circuitry for determining a first luminance approximation for said absent pixel wherein said first luminance approximation comprises a blend of a spatial computation and a temporal computation of said absent pixel.

19. The system of claim 18 wherein said spatial computation comprises computing an average of two present pixels, wherein said two present pixels comprise a first present pixel positioned one unit above said absent pixel in a spatially vertical direction, and a second present pixel positioned one unit below said absent pixel in said spatially vertical direction, said first present pixel and said second present pixel having identical temporal and horizontally spatial coordinates.

20. The system of claim 19 wherein said temporal computation comprises computing an average of two present pixels, wherein said two present pixels comprises a third present pixel that precedes said absent pixel by one unit in time, and a fourth present pixel that follows said absent pixel by one unit in time, said third present pixel and said fourth present pixel having identical horizontal and vertical spatial coordinates.

21. The system of claim 18 wherein said temporal computation comprises computing an average of two present pixels, wherein said two present pixels comprises a first present pixel that precedes said absent pixel by one unit in time, and a second present pixel that follows said absent pixel by one unit in time, said first present pixel and said second present pixel having identical horizontal and vertical spatial coordinates.

22. The system of claim 17 further comprising:
a fourth circuitry for:
computing a first difference between said first pixel luminance and said first luminance approximation;
computing a second difference between said second pixel luminance and said first luminance approximation; and
computing a third difference by subtracting an absolute value of said second difference from an absolute value of said first difference.

23. The system of claim 22 further comprising:
a fifth circuitry for:
computing a second luminance approximation using vertical detail adjacent to said absent pixel;
computing a third luminance approximation using horizontal detail adjacent to said absent pixel;
determining a maximum of said second luminance approximation and said third luminance approximation; and
computing a fourth difference by subtracting said maximum from said third difference.

24. The system of claim 23 further comprising:
a sixth circuitry for computing an absolute value of a fifth difference, said fifth difference obtained by subtracting said maximum from said first difference, said absolute value of said fifth difference used when said pull-down video comprises 3:2 pull-down video and said absent pixel is obtained from a field that is temporally positioned between two repeat fields of said 3:2 pull-down video.

25. The system of claim 24 wherein said second luminance approximation comprises:

computing an absolute value of a sixth difference between the luminance of a first present pixel and the luminance of a second present pixel, said first present pixel positioned one unit above said absent pixel in a spatially vertical direction, and said second present pixel positioned one unit below said absent pixel in said spatially vertical direction, said first present pixel and said second present pixel having identical temporal coordinates and identical first horizontally spatial coordinates;

computing an absolute value of a seventh difference between the luminance of a third present pixel and the luminance of a fourth present pixel, said third present pixel positioned one unit above said absent pixel in a spatially vertical direction, and said fourth present pixel positioned one unit below said absent pixel in said spatially vertical direction, said third present pixel and said fourth present pixel having said identical temporal coordinates and identical second horizontally spatial coordinates;

computing an absolute value of an eighth difference between the luminance of a fifth present pixel and the luminance of a sixth present pixel, said fifth present pixel positioned one unit above said absent pixel in a spatially vertical direction, and said sixth present pixel positioned one unit below said absent pixel in said spatially vertical direction, said fifth present pixel and said sixth present pixel having said identical temporal coordinates and identical third horizontally spatial coordinates, said first horizontally spatial coordinates positioned one unit in a negative direction from said second horizontally spatial coordinates, said third horizontally spatial coordinates positioned one unit in a positive direction from said second horizontally spatial coordinates; and determining a first largest value from said absolute value of said sixth difference, said absolute value of said seventh difference, and said absolute value of said eighth difference, wherein said second luminance approximation is equal to said first largest value.

26. The system of claim 25 wherein said third luminance approximation comprises:
determining a first maximum of said luminance of said first present pixel, said luminance of said third present pixel, and said luminance of said fifth present pixel;
determining a second maximum of said luminance of said second present pixel, said luminance of said fourth present pixel, and said luminance of said sixth present pixel;
determining a first minimum of said luminance of said first present pixel, said luminance of said third present pixel, and said luminance of said fifth present pixel;
determining a second minimum of said luminance of said second present pixel, said luminance of said fourth present pixel, and said luminance of said sixth present pixel;
computing an eighth difference by subtracting said first minimum from said first maximum;
computing a ninth difference by subtracting said second minimum from said second maximum; and
determining a second largest value of said eighth difference and said ninth difference, wherein said third luminance approximation is equal to said second largest value.

27. The system of claim 26 wherein said fourth difference is obtained for each said absent pixel in an entire field of said pull-down video and is used to generate a frame inverse telecine difference value.

28. The system of claim 27 wherein said frame inverse telecine difference value is obtained using the equation, $$\text{Frame\_IT\_diff}_{det} \mathrel{+}= \begin{cases} 0 & \text{when} -255 \le \text{IT\_diff}_{det} < 4 \\ 1 & \text{when } 4 \le \text{IT\_diff}_{det} < 8 \\ 4 & \text{when } 8 \le \text{IT\_diff}_{det} < 16 \\ 8 & \text{when } 16 \le \text{IT\_diff}_{det} < 32 \\ 16 & \text{when } 32 \le \text{IT\_diff}_{det} \le 255 \end{cases}.$$

29. The system of claim 28 further comprising:
a seventh circuitry for:
first comparing said frame inverse telecine difference value to a first threshold;
second comparing said frame inverse telecine difference value to a second threshold;
processing said pull-down video by said temporally weaving in one or more expected weave directions if said frame inverse telecine difference value is less than said first threshold;
processing said pull-down video using a blend of said temporally weaving in one or more expected weave directions and a motion adaptive deinterlace process if said frame inverse telecine difference value is greater than said first threshold but less than a second threshold; and
processing said pull-down video using said motion adaptive deinterlace process if said frame inverse telecine difference value is greater than said second threshold.

30. The system of claim 29 wherein said blend is determined by determining the maximum of one or more measures, said one or more measures enabled using one or more control signals.

31. The system of claim 30 wherein said one or more control signals may be enabled if said frame inverse telecine difference value is greater than said first threshold but less than said second threshold.

32. A system for detecting and correcting irregularities when performing an inverse telecine deinterlacing of pull-down video, said system comprising:
a memory;
a set of software instructions resident in said memory; and
a processor used to execute said set of software instructions, wherein executing said set of software instructions performs said inverse telecine deinterlacing to improve displayed video image quality, said executing said set of software instructions for computing a frame inverse telecine difference, wherein said frame inverse telecine difference is computed using the equation, $$\text{Frame\_IT\_diff}_{det} \mathrel{+}= \begin{cases} 0 & \text{when} -255 \le \text{IT\_diff}_{det} < 4 \\ 1 & \text{when } 4 \le \text{IT\_diff}_{det} < 8 \\ 4 & \text{when } 8 \le \text{IT\_diff}_{det} < 16 \\ 8 & \text{when } 16 \le \text{IT\_diff}_{det} < 32 \\ 16 & \text{when } 32 \le \text{IT\_diff}_{det} \le 255 \end{cases}.$$

33. A system for detecting and correcting irregularities when performing an inverse telecine deinterlacing of pull-down video, said system comprising:
a memory;
a set of software instructions resident in said memory; and
a processor used to:

execute said set of software instructions, wherein executing said set of software instructions determines the correct weave direction while said deinterlacing is performed, and compute a frame inverse telecine difference, said frame inverse telecine difference computed using the equation:

$$\text{Frame\_IT\_diff}_{det} \mathrel{+}= \begin{cases} 0 & \text{when} -255 \leq \text{IT\_diff}_{det} < 4 \\ 1 & \text{when } 4 \leq \text{IT\_diff}_{det} < 8 \\ 4 & \text{when } 8 \leq \text{IT\_diff}_{det} < 16 \\ 8 & \text{when } 16 \leq \text{IT\_diff}_{det} < 32 \\ 16 & \text{when } 32 \leq \text{IT\_diff}_{det} \leq 255 \end{cases}.$$

34. The system of claim 33 further comprising at least one circuitry that computes said frame inverse telecine difference.

35. A system for detecting and correcting irregularities when performing an inverse telecine deinterlacing of pull-down video, said system comprising:
a memory;
a set of software instructions resident in said memory;
a processor used to execute said set of software instructions, wherein executing said set of software instructions determines the correct weave direction while said deinterlacing is performed;
at least one circuitry that computes per-pixel bad weave motion;
at least one circuitry that computes per-pixel unexpected field motion; and
at least one circuitry that computes per-pixel repeat field motion.

36. A system for detecting and correcting irregularities when performing an inverse telecine deinterlacing of pull-down video, said system comprising:
a memory;
a set of software instructions resident in said memory;
a processor used to execute said set of software instructions, wherein executing said set of software instructions performs said inverse telecine deinterlacing to improve displayed video image quality;
at least one circuitry that computes per-pixel bad weave motion;
at least one circuitry that computes per-pixel unexpected field motion; and
at least one circuitry that computes per-pixel repeat field motion.

37. A system for detecting and correcting irregularities when performing an inverse telecine deinterlacing of pull-down video, said system comprising:
a memory;
a set of software instructions resident in said memory; and
a processor used to execute said set of software instructions, wherein executing said set of software instructions:
determines the correct weave direction while said deinterlacing is performed, and
computes a frame inverse telecine difference.

38. A system for detecting and correcting irregularities when performing an inverse telecine deinterlacing of pull-down video, said system comprising:
a memory;
a set of software instructions resident in said memory;
a processor used to execute said set of software instructions, wherein executing said set of software instructions determines the correct weave direction while said said deinterlacing is performed; and
wherein said inverse telecine deinterlacing comprises performing a 3:2 reverse pull-down and said correct weave direction comprises one of: forwards, backwards, and average.

39. A system for detecting and correcting irregularities when performing an inverse telecine deinterlacing of pull-down video, said system comprising:
a memory;
a set of software instructions resident in said memory;
a processor used to execute said set of software instructions, wherein executing said set of software instructions determines the correct weave direction while said said deinterlacing is performed; and
wherein said inverse telecine deinterlacing comprises performing a 2:2 reverse pull-down and said correct weave direction comprises one of: forwards and backwards.

* * * * *